United States Patent [19]
Anderson

[11] 3,798,072
[45] Mar. 19, 1974

[54] ENGINE COMPONENT HEATING SYSTEM
[75] Inventor: Arthur Anderson, Chicago, Ill.
[73] Assignee: The Raymond Lee Organization, Inc., New York, N.Y.
[22] Filed: Aug. 21, 1972
[21] Appl. No.: 282,306

[52] U.S. Cl............ 123/142.5 E, 136/161, 290/50, 219/205
[51] Int. Cl....... F01m 5/02, B60l 1/02, F02n 17/02
[58] Field of Search....... 123/142.5, 142.5 E; 320/2, 320/35; 136/161; 219/205; 290/50

[56] References Cited
UNITED STATES PATENTS

| | | | |
|---|---|---|---|
| 1,266,780 | 5/1918 | Edison | 123/142.5 R |
| 1,992,568 | 2/1935 | Connor | 123/142.5 R |
| 2,389,925 | 11/1945 | Morgan et al. | 123/142.5 E |
| 2,418,792 | 4/1947 | Riggs | 136/161 |
| 2,516,048 | 7/1950 | Endress | 136/161 |
| 2,626,971 | 1/1953 | Mansoff | 136/161 |
| 2,710,936 | 6/1955 | Lowry et al. | 320/2 |
| 2,710,937 | 6/1955 | Godshalk et al. | 320/25 X |
| 3,110,633 | 11/1963 | Bachmann | 123/161 |
| 3,251,017 | 5/1966 | Okerstrom | 123/142.5 R |

Primary Examiner—Al Lawrence Smith
Attorney, Agent, or Firm—Daniel Jay Tick

[57] ABSTRACT

A heating unit for the oil dip stick of the oil system of the engine of an automotive vehicle is electrically connected to an auxiliary battery via a thermostatically controlled switch. The heating unit thereby heats the oil when the temperature drops below a predetermined level.

5 Claims, 2 Drawing Figures

ENGINE COMPONENT HEATING SYSTEM

DESCRIPTION OF THE INVENTION

The present invention relates to an engine component heating system. More particularly, the invention relates to an engine component heating system for an automotive vehicle.

The principal object of the invention is to provide an engine component heating system of simple structure, which is inexpensive in manufacture and which functions efficiently, effectively, rapidly and reliably to heat the oil and the battery when the temperature drops below a predetermined level.

An object of the invention is to provide an engine component heating system of simple structure which heats the oil and the battery of the engine of an automotive vehicle when the temperature drops below a predetermined level, without utilizing an outside source of power.

Figure 1:
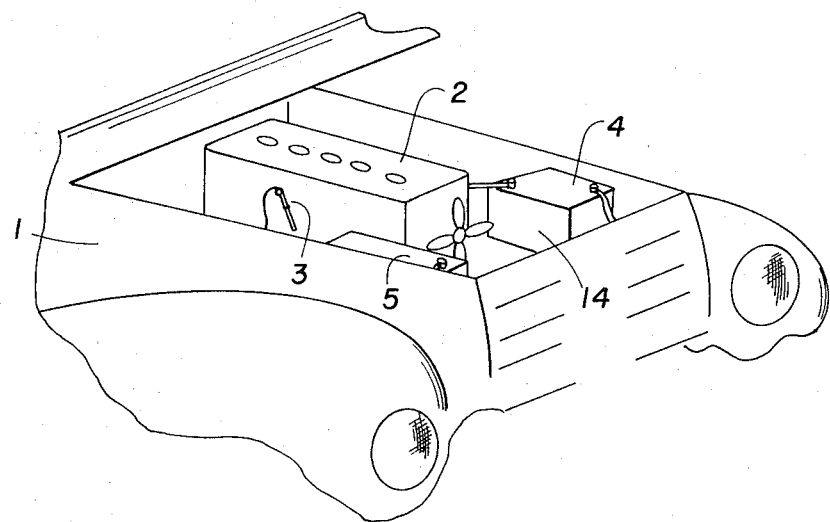
Figure 2:
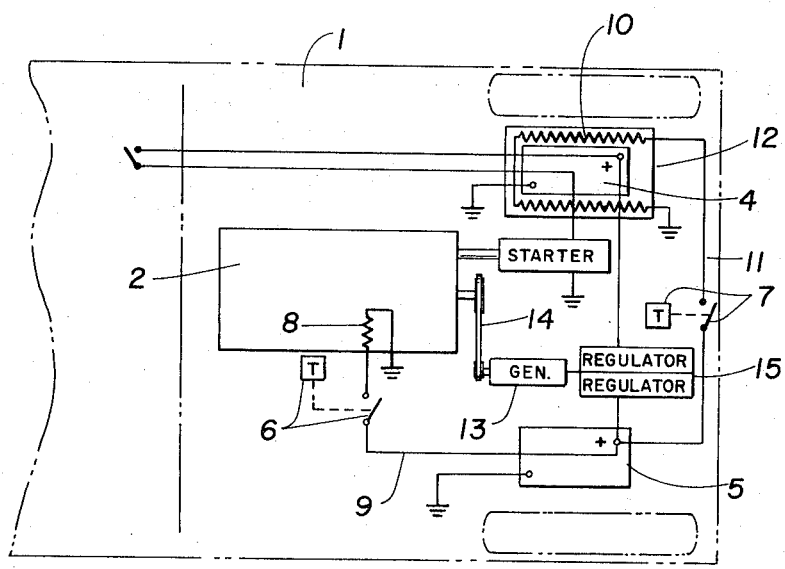

In order that the invention may be readily carried into effect, it will now be described with reference to the accompanying drawing, wherein:

FIG. 1 is a block diagram of an embodiment of the engine component heating system of the invention; and FIG. 2 is a circuit diagram of the engine component heating system of the invention.

In the FIGS., the same components are identified by the same reference numerals.

The engine component heating system of the invention is for an automotive vehicle 1 having an engine 2. The vehicle 1 has an oil system for lubricating the engine 2. The oil system has a reservoir and an oil dip stick 3 therein (FIG. 1). A battery 4 is utilized to start the engine 2.

The engine component heating system of the invention comprises an auxiliary battery 5. A first thermostatically controlled switch 6 (FIG. 2) and a second thermostatically controlled switch 7 (FIG. 2) are provided. The switches 6 and 7 close, to close their circuits, when the temperature drops below a predetermined level.

A heating unit 8 (FIG. 2) for the oil dip stick 3 (FIG. 1) is electrically connected to the auxiliary battery 5 via the first thermostatically controlled switch 6 and an electrical conductor 9 for heating the oil when the temperature drops below the predetermined level.

A heating unit 10 (FIG. 2) for the battery 4 is electrically connected to the auxiliary battery 5 via the second thermostatically controlled switch 7 and an electrical conductor 11 for heating the battery when the temperature drops below the predetermined level. The battery 4 and its heating unit 10 are housed in a thermally insulated housing 12.

The vehicle 1 has battery charging means, comprising a generator 13 coupled to the fan belt 14 of the engine (FIG. 2) and voltage regulators 15. The battery charging means is electrically connected to the battery 4 and to the auxiliary battery 5 and charges both batteries when the engine 2 is running.

While the invention has been described by means of specific examples and in specific embodiments, I do not wish to be limited thereto, for obvious modifications will occur to those skilled in the art without departing from the spirit and scope of the invention.

I claim:

1. An engine component heating system for an automotive vehicle having an engine, an oil system for lubricating the engine having a reservoir and an oil dip stick therein and a battery for starting the engine, said engine component heating system comprising
    an auxiliary battery;
    a first thermostatically controlled switch; and
    a heating unit for the oil dip stick electrically connected to the auxiliary battery via the first thermostatically controlled switch for heating the oil when the temperature drops below a predetermined level.

2. An engine component heating system for an automotive vehicle having an engine and a battery for starting the engine, said engine component heating system comprising
    an auxiliary battery;
    a thermostatically controlled switch; and
    a heating unit for the battery electrically connected to the auxiliary battery via the thermostatically controlled switch for heating the battery when the temperature drops below a predetermined level.

3. An engine component heating system as claimed in claim 1, further comprising a second thermostatically controlled switch, and a heating unit for the battery electrically connected to the auxiliary battery via the second thermostatically controlled switch for heating the battery when the temperature drops below a predetermined level.

4. An engine component heating system as claimed in claim 2, further comprising a thermally insulated housing, and wherein the battery and the heating unit for the battery are housed in the housing.

5. An engine component heating system as claimed in claim 3, wherein the automotive vehicle has battery charging means coupled to the engine and electrically connected to the battery and to the auxiliary battery for charging both batteries when the engine is running.

* * * * *